United States Patent
Stapp et al.

(10) Patent No.: US 7,302,484 B1
(45) Date of Patent: *Nov. 27, 2007

(54) TECHNIQUES FOR SELECTING AVAILABLE SUBNETS FOR DELEGATION AMONG DYNAMIC HOST CONFIGURATION SERVERS

(75) Inventors: Mark Stapp, Belmont, MA (US); Kenneth Kinnear, Jr., Boxborough, MA (US)

(73) Assignee: Cisco Technology, Inc., San Jose, CA (US)

( * ) Notice: Subject to any disclaimer, the term of this patent is extended or adjusted under 35 U.S.C. 154(b) by 654 days.

This patent is subject to a terminal disclaimer.

(21) Appl. No.: 10/218,555

(22) Filed: Aug. 13, 2002

Related U.S. Application Data

(63) Continuation-in-part of application No. 10/001,415, filed on Oct. 24, 2001, now Pat. No. 7,051,089.

(51) Int. Cl.
*G06F 15/173* (2006.01)
*G06F 12/02* (2006.01)

(52) U.S. Cl. ..................... 709/226; 345/543
(58) Field of Classification Search ........ 709/220–222, 709/223, 226, 245; 714/702; 345/543
See application file for complete search history.

(56) References Cited

U.S. PATENT DOCUMENTS

| | | | |
|---|---|---|---|
| 5,742,793 A * | 4/1998 | Sturges et al. ............... | 711/152 |
| 6,009,103 A | 12/1999 | Woundy | |
| 6,178,455 B1 | 1/2001 | Schulte et al. | |
| 6,219,715 B1 | 4/2001 | Ohno et al. | |
| 6,286,038 B1 | 9/2001 | Reichmeyer et al. | |
| 6,577,628 B1 | 6/2003 | Hejza | |
| 6,578,074 B1 | 6/2003 | Bahlmann | |
| 6,654,891 B1 | 11/2003 | Borsato et al. | |
| 6,697,360 B1 | 2/2004 | Gai et al. | |
| 6,775,276 B1 | 8/2004 | Beser | |
| 6,801,949 B1 | 10/2004 | Bruck et al. | |

OTHER PUBLICATIONS

Taniguchi et al., Subnet Configuration Option Set for DHCP, Mar. 2, 1998, Network Working Group, IETF, <draft-ietf-dhcp-dyn-subnet-conf-02.txt>, PP. abstract, 3-6, 8-12.*
R. Droms, "Dynamic Host Configuration Protocol", Mar. 1997, pp. 1-45.
S. Alexander et al., "DHCP Options and BOOTP Vendor Extensions", Mar. 1997, pp. 1-34.

* cited by examiner

*Primary Examiner*—William Vaughn
*Assistant Examiner*—Peling A Shaw
(74) *Attorney, Agent, or Firm*—Hickman Palermo Truong & Becker LLP

(57) ABSTRACT

A method and apparatus for providing network addresses for hosts on a network includes generating and storing network configuration information in a subnet management process, where a subnet is a set of contiguous network addresses. The network configuration information indicates network addresses to be distributed among a plurality of network devices. Policy information is also generated and stored. The policy information indicates a policy set of one or more policy processes. Each policy process selects an available subnet from available network addresses. A request for a subnet is received from a subnet requesting process. A particular subnet is determined based on the network configuration information, the request, and the policy set. A response indicating the particular subnet is sent to the subnet requesting process. These techniques allow an administrator to choose a policy for selecting subnets that better utilizes network resources for a wide range of network architectures.

40 Claims, 8 Drawing Sheets

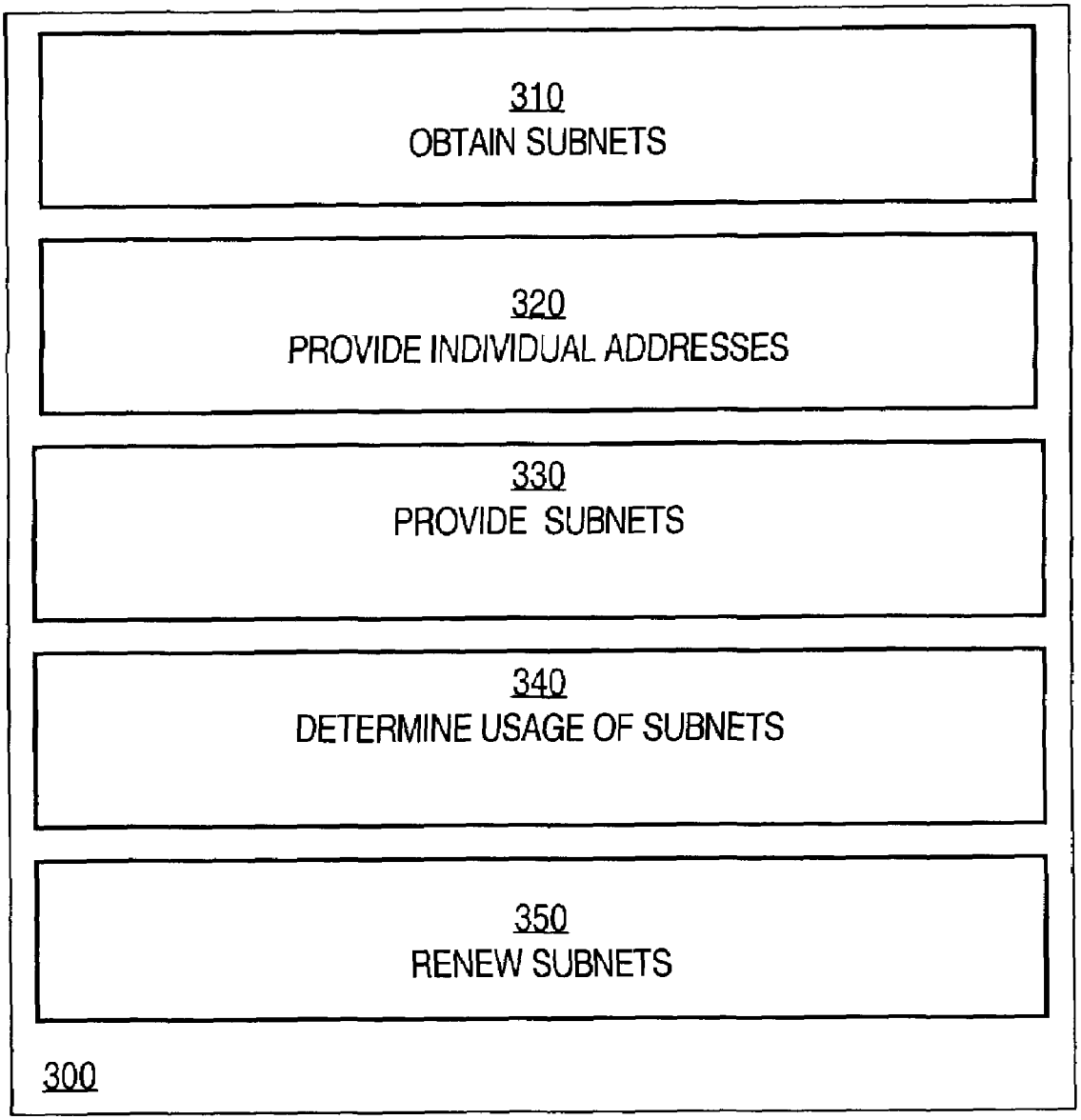

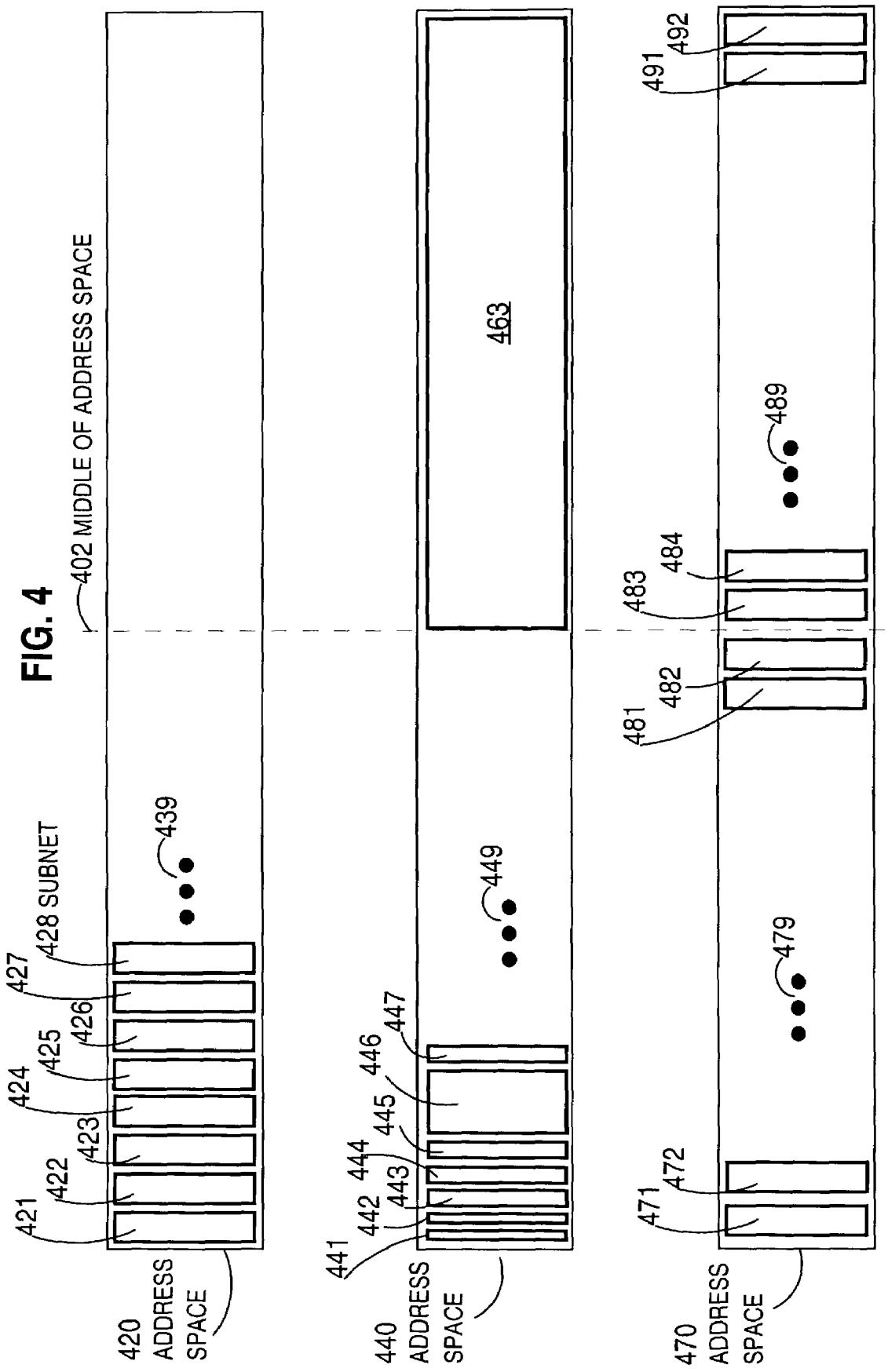

TECHNIQUES FOR SELECTING AVAILABLE SUBNETS FOR DELEGATION AMONG DYNAMIC HOST CONFIGURATION SERVERS

CROSS REFERENCE TO RELATED APPLICATION

This application claims benefit under 35 U.S.C. §120 as a Continuation-in-part of prior application Ser. No. 10/001,415, entitled "Techniques for Automatically Delegating Address Spaces Among Dynamic Host Configuration Servers," by inventors Richard Johnson, Kenneth Kinnear, Jr., Mark Stapp and Jayadev Kumarasamy, filed Oct. 24, 2001 now U.S. Pat. No. 7,051,089, the entire contents of which is hereby incorporated by reference as if fully set forth herein. This application is hereinafter referenced as Johnson et al.

FIELD OF THE INVENTION

The present invention generally relates to managing network addresses for hosts on a network. The invention relates more specifically to techniques for selecting available subnets for delegation among dynamic host configuration servers.

BACKGROUND OF THE INVENTION

A computer network includes computer processors or "hosts" that host software applications that provide or request services, or both. The hosts may be network terminals or end stations that do not perform network traffic routing or forwarding functions. The hosts communicate with each other through network devices, such as switches and routers, sometimes called intermediate devices, which do perform routing and forwarding functions. When a host is added to a network by connecting directly to another host, or indirectly to another host through one or more intermediate devices, the host must be configured for network operations. For example, the newly added host is assigned a logical network address for itself, and a network address for the intermediate device that routes or forwards its traffic, among other configuration information.

Computer networks that employ the Transmission Control Protocol and Internet Protocol (TCP/IP) for sending packets of information between devices on the network are proliferating, and as a result, logical network addresses that are used to locate each device on the network have become scarce. Further, in many local networks with many different computers, the number and location of the computers connected to the network may change regularly. In addition, of the many computers physically connected at one time, only a fraction of the computers are on and operating at one time. Thus one or more hosts are being added and dropped frequently.

A specific context in which this problem arises involves large-scale cable modem networks in which voice and other services are delivered over an Internet Protocol network that uses coaxial cable for communications. Addresses are dynamically assigned to cable modems of end users as the users subscribe to and terminate use of service, and to devices that cannot persistently store an address. In this context, it is wasteful to give every device a unique and permanent network address. A number of addresses sufficient for the total anticipated subscriber base can be shared, but configuring each host with a new address is a tedious process to perform manually.

The Dynamic Host Configuration Protocol (DHCP) provides a mechanism through which computers using TCP/IP can obtain network addresses and other configuration information automatically. DHCP is an open standard protocol for dynamic host configuration described in request for comments (RFC) documents numbered 2131 and 2132 available at the time of this writing as rfc2131.txt and rfc2132.txt, respectively, on the worldwide web (www) at domain and directory ietf.org/rfc. A DHCP server process operates on a DHCP server host that is conveniently located for several hosts on one or more local networks. One or more DHCP server hosts and processes are set up by a system administrator with information to configure the hosts on one or more local networks to reflect the current architecture of those local networks. A DHCP client process operates on each host of the local networks. As used hereinafter, a server refers to the server process and a client refers to the client process unless otherwise indicated to refer to the host or device on which the process executes.

Multiple DHCP servers may serve the same network or portion of the network. The IP addresses available for each network or portion of the network are distributed among the DHCP servers and placed in a data structure at each DHCP, thus forming a pool of addresses that the individual DHCP server may allocate. In conventional systems, a network administrator divides a set or range of network addresses among multiple DHCP servers to reflect the current architecture of the network. Many thousands and even millions of network addresses might be stored in the address pools of the multiple DHCP servers. It is an extremely tedious and error-prone process to manually apportion thousands of network addresses among the address pools of dozens or hundreds of DHCP servers.

One approach to simplify the manual process is to specify a set of contiguous network addresses for a DHCP server as a subnet. A subnet is a base address and a range of addresses above the base address, and therefore is simpler to enter manually as compared to listing each address individually. An IP address consists of 32 bits, often represented as four 8-bit numbers separated by periods, e.g., A.B.C.D, where the letters A, B, C, D each represent one 8-bit number. An 8-bit number can represent values from 0 though 255. In a range of contiguous addresses the leftmost bits are constant and the rightmost change. For example, in a range of network addresses from 20.17.123.000 to 20.17.123.255 the three 8-bit numbers on the left are constant, i.e., the 24 leftmost bits are constant. Network hosts use their knowledge of the subnet that their address is part of when they send messages. Messages that are destined for another host on the same subnet can usually be sent directly to that host. Messages destined for hosts on different subnets usually need to be forwarded to that other subnet by a router. A virtual mask is laid over an address in order to separate it into the leftmost, or network part, and the rightmost, or host part. Routers may use the network portion of the address to efficiently direct traffic to physical segments of the network.

The number of bits in the mask is the size of the mask. The size of the mask is an indicator of the range in the subnet because the remaining bits are allowed to change within the subnet. For example, the mask of size 24 bits implies a range of 8 bits, from 0-255, for addresses in the subnet. The subnet always begins at an address with all zeroes in the unmasked portion.

Several problems occur even with specifying addresses in subnets. First, the apportionment among multiple DHCP servers is still manual, and therefore tedious and error-prone where there are many DHCP servers and many subnets.

Second, even if values are entered correctly, the apportionment may not be optimal for the actual distribution of hosts on the network. One DHCP server may be apportioned too large a subnet or too many subnets for the number of hosts that use the portion of the network the DHCP server serves, while another DHCP server may be apportioned too small or too few subnets. When a shortage of addresses arises at one DHCP server, the network administrator manually identifies a DHCP server with excess addresses and moves at least some of the excess addresses, perhaps in one or more subnets, to the DHCP server experiencing a shortage. Alternatively the network administrator manually requests additional subnets from a higher authority.

In one approach, a dynamic subnet configuration server (DSC server) is introduced to assign subnets to DHCP servers as requested by the DHCP servers. However, this does not eliminate the problems of conventional DHCP servers, and an administrator must still apportion subnets among the DSC servers if there are multiple DSC servers. Also, a DSC server cannot automatically request additional subnets when all its subnets have been assigned.

Another problem is that the DSC server does not consider the relative needs of DHCP servers requesting the subnets. For example, two DHCP servers may request renewal of their subnets of mask size 24 bits, yet one of the requesting DHCP servers may be using 45% of the addresses in the subnets while the other is using 90%. If network addresses are scarce, it is more desirable to apportion a smaller subnet (i.e., a subnet having a larger mask size) to the first DHCP server than to the second. For example, it is desirable to renew the DHCP server that is making 45% use of its addresses with a subnet of mask size 25 while providing the full subnet of mask size 24 to the DHCP server making use of 90% of its addresses.

In an approach presented in Johnson et al., modified DHCP servers behave as subnet management processes to manage and distribute subnets of addresses among themselves in addition to leasing individual network addresses to hosts. As described in Johnson et al., multiple modified DHCP servers communicate using DHCP messages to automatically apportion subnets among each other based on the relative usage of the subnets. In addition, an individual router may request a subnet for use on its particular network segment.

However, the approach presented in Johnson et al., does not disclose details about how a particular subnet management process selects a particular subnet from one or more subnets of available network addresses to satisfy a request from another subnet management process.

One past approach is to divide the pool of network addresses managed by the subnet management process into multiple subnets of the same fixed or specified size. The specified size is selected to satisfy the typical request for a subnet. For example, the specified size is selected to have a mask size of 25 so that each subnet includes 128 addresses. As each request to lease a subnet arrives at the subnet management process, the subnet management process allocates the next available subnet. When a lease expires or a requesting process releases a subnet, the subnet is made available for the next requesting process.

However, while suitable for many purposes, this approach has numerous disadvantages. One disadvantage is that the specified size may be too large for some requests, which is wasteful of scarce network address space. For example, the subnet request may be for a process operating on a router serving as the only intermediate device connected to a segment with four hosts. If there are no further segments down this path, allocating a subnet with 128 addresses to such a router wastes 123 addresses that might be needed on a different set of network devices.

Another disadvantage is that the specified size may be too small for some requests, which causes the response to waste network bandwidth. For example, a request from another subnet management process for a subnet of 1024 addresses to allocate to a heavily used network would require the supplying subnet management process to send eight subnets of 128 addresses each. Sending eight subnets takes eight times the data needed to send one subnet. Therefore more data is sent and more bandwidth is consumed.

Furthermore, in some cases, only one subnet is sent in response to each request, so the request for 1024 addresses would be repeated eight times to obtain the eight responses; consequently eight times the network traffic is produced. This approach consumes even more network bandwidth than including eight subnets in one response because the other fields of the TCP/IP and DHCP protocols are repeated in each of the eight responses, and seven additional requests are made.

Another disadvantage is that multiple discontinuous subnets may be allocated to the same intermediate device. Multiple discontinuous segments assigned to segments connected to the same intermediate device may complicate the routing mechanism employed on the intermediate device and intervening intermediate devices. For example, assume that four subnets of a mask size of 27 and starting addresses A.B.C.0, A.B.D.64 and A.B.E.32 and A.B.E.128 are delegated to a requesting subnet management process that allocates addresses on a given portion of the network behind a certain router. Intervening intermediate devices require four separate entries in their routing tables for the four subnets that direct traffic to that certain router. In general, this is less efficient, at each intermediate device, than having a single entry in the routing tables for all the hosts connected through the same router. Thus, it would be preferable for the four subnets of mask size 27 delegated by the subnet management process to be adjacent, so that they can be represented in routing tables by a single subnet of mask size 25. For example, it would be preferable for the 128 addresses to be represented by a single subnet of mask size 25 and starting address A.B.E.128. Then the intermediate devices between the sending host and that certain router can direct all traffic to that router based on a single entry in the routing tables.

The details of how a particular subnet is constructed or selected from the available network addresses should be chosen in a way that is appropriate for particular network architecture. Different approaches are appropriate for different network architectures. For example, network architectures in which all the subnet management processes are serving portions of the network that are similar in size may be well served by a plurality of subnets of a certain size. However, in networks in which address space is extremely scarce, it may be preferable to provide subnets no larger than the size requested or used. While, in networks in which there are many intermediate devices with complex routing computations that affect throughput, adjacent subnets should be assigned to a particular device requesting multiple subnets. Other network architectures may benefit from other policies for selecting available subnets developed by users of the other network architectures.

Based on the foregoing, there is a clear need for techniques that permit the use of one or more policies for selecting subnets of available addresses from a plurality of network addresses managed by a subnet management process.

In particular, there is a need for a policy for selecting subnets that minimizes waste of scarce network address space.

In particular, there is a need for a policy for selecting subnets that reduces complexity in routing traffic to hosts using addresses from those subnets.

There is also a need for techniques that allow a user to employ a particular policy for selecting available subnets that is appropriate for a user's particular network architecture.

SUMMARY OF THE INVENTION

The foregoing needs, and other needs and objects that will become apparent from the following description, are achieved in the present invention, which comprises, in one aspect, a method for providing network addresses for hosts on a network. The method includes generating and storing network configuration information in a subnet management process, where a subnet is a set of contiguous network addresses. The network configuration information indicates network addresses to be distributed among multiple network devices. Policy information is also generated and stored. The policy information indicates a policy set of one or more policy processes. Each policy process selects an available subnet from available network addresses. A request for a subnet is received from a subnet requesting process. A particular subnet is determined based on the network configuration information, the request, and the policy set. A response indicating the particular subnet is sent to the subnet requesting process.

In an embodiment of this aspect, generating and storing policy information includes registering a separate policy process into the policy set. Determining the particular subnet includes sending a message to the separate policy process, and receiving guidance information affecting a choice of the particular subnet.

In other aspects, the invention encompasses a computer apparatus, a system, and a computer readable medium including a carrier wave configured to carry out the foregoing steps.

These techniques allow an administrator to choose a policy for selecting subnets that better utilizes network resources for a wide range of network architectures.

BRIEF DESCRIPTION OF THE DRAWINGS

The present invention is illustrated by way of example, and not by way of limitation, in the figures of the accompanying drawings in which like reference numerals refer to similar elements and in which:

FIG. 3 is a functional decomposition diagram that illustrates a high level overview of one embodiment of a method for managing subnets;

FIG. 4 is a block diagram that illustrates data structures storing subnets for three policy processes according to an embodiment;

DETAILED DESCRIPTION OF THE PREFERRED EMBODIMENT

A method and apparatus for providing subnets for dynamic host configuration are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1. | Operational Context |
| 2. | Structural Overview |
| 3. | Functional Overview |
| 4. | Data Structure Holding Subnets |
| 5. | Method for Selecting Subnets |
| | 5.1 Subnet Selection Policy Information |
| | 5.2 Executing the First Policy Process |
| | 5.3 Executing a User-supplied Policy Process |
| | 5.4 Executing the Second Policy Process |
| | 5.5 Executing the Third Policy Process |
| 6. | Hardware Overview |
| 7. | Extensions and Alternatives |

\* \* \*

1. Operational Context

Delegating address space among host configuration servers is described herein in the context of modified DHCP servers serving as subnet management processes. However, embodiments are not limited to this context. The techniques can be applied in other contexts using other protocols to provide subnets to devices on a network, such as authentication servers implementing the RADIUS protocol and servers for router auto-configuration. An advantage of the embodiments in modified DHCP servers is that the DHCP message formats are extensible to accommodate the subnet delegation information passed among DHCP servers.

2. Structural Overview

Figure 1:
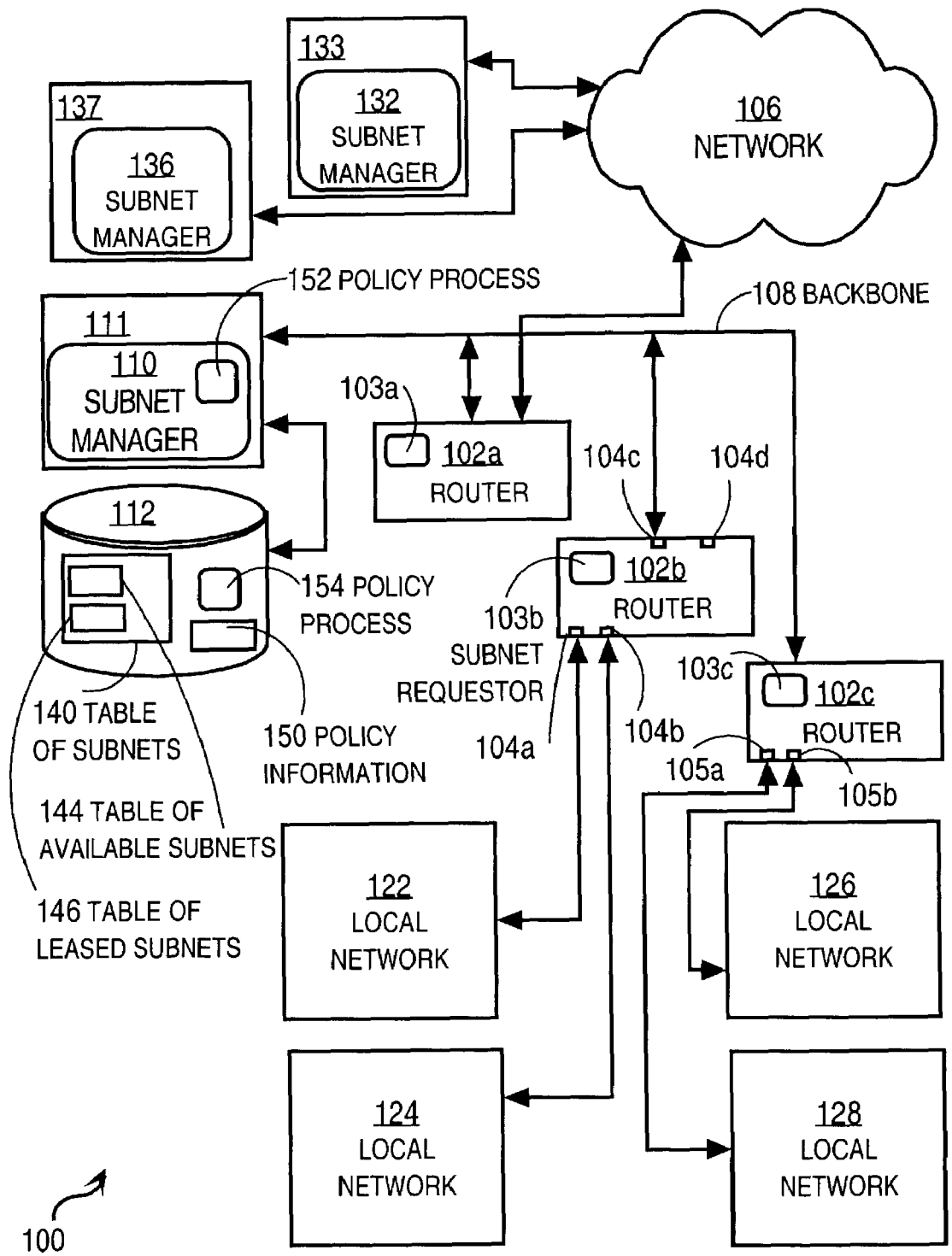
FIG. 1 is a block diagram that illustrates a network with subnet managers according to an embodiment.

FIG. 1 is a block diagram that illustrates a network with subnet managers according to an embodiment. This example network is used to demonstrate techniques of embodiments of the invention.

In. FIG. 1, a hypothetical network 100 includes a set of routers 102, comprising individual routers 102a, 102b, 102c, for accepting traffic from one or more local networks, and for placing that traffic onto another network 106. The network 106 may be an internetwork such as the Internet, a wide-area network, another local network, etc. Traffic comprises the flow of one or more data packets over a network. Each router has multiple interfaces for connections to other devices or networks of devices. For example, router 102b includes four interfaces 104a, 104b, 104c, 104d, among others that are not shown for clarity.

The network 100 includes a subnet management process 110 ("subnet manager") executing on a server device 111 connected to all the routers through a backbone connection 108. Additional subnet managers 132, 136 on devices 133, 137, respectively, are connected to the network portion 106. Subnet manager 110 provides subnets in response to requests for subnets received from other subnet managers 132, 136. In addition, subnet manager 110 obtains subnets in response to requests for subnets sent to one or more other subnet managers 132, 136.

The server device 111 is connected to a persistent storage device 112 including a database having data structures for subnets being managed, such as table 140 of subnets. The data structure for subnets includes a data structure 144 for available subnets, which are subnets not yet delegated or allocated to any other subnet manager or router. The data structure for subnets includes a data structure 146 for leased subnets, which are subnets delegated or allocated to another subnet manager or router. The data structure 146 for leased subnets stores information about leased subnets including the subnet managers or routers to which the subnets are delegated or allocated. As illustrated, data structures 144, 146 are separate data structures within table 140. In other embodiments data structures 144, 146 are interleaved rows in table 140 that are logically separated by contents of one or more fields describing the lessees, or by an index, rather than being separated into different data structures or reserved portions of the same data structure.

Subnet manager 110 includes a policy process 152 that provides rules for selecting a subnet from the data structure of available subnets. Another policy process 154 is stored on persistent store 112. The policy process 154 provides different rules than policy process 152 for selecting a subnet from the data structure of available subnets. The policy process 154 is provided separately from the policy process 152 built into the subnet manager 110. For example, the separate policy process 154 is provided as an update of the policy process 152. A network manager may design the separate policy process 154 for the particular network 100. Alternatively, a third party provides policy process 154. The policy process 154 may be used in place of policy process 152; policy process 154 may be used together with policy process 152 to refine or filter the results. The use of multiple policy processes is described in more detail below with reference to FIG. 3.

The persistent store 112 includes policy information 150. The policy information 150 indicates the one or more policy processes to invoke in selecting a subnet from the available network addresses. In some embodiments, a policy process is indicated in the policy information 150 by name or network address or some combination. The policy information 150 may include the values of parameters to pass to the policy process when a policy process is invoked. The policy information 150 may include instructions that cause a processor to perform a particular policy process, such as for a third policy process (not shown). In some embodiments, the policy information 150 includes a sequence for invoking several policy processes. The use of multiple policy processes is described in more detail below with reference to FIG. 3.

The subnet manager device 111 is connected to the router 102b through backbone connection 108 and router interface 104c. Local networks 122, 124 are connected directly to router 102b at interfaces 104a, 104b, respectively. The subnet manager device 111 is also connected to the router 102c through backbone connection 108 and a router interface (not shown for clarity). Local networks 128, 126 are connected directly to router 102c at interfaces 105a, 105b, respectively. Subnets for local networks 122, 124 are provided by subnet manager 110 in response to requests for subnets from subnet requester process 103b on router 102b. Subnets for local networks 126, 128 are provided by subnet manager 110 in response to requests for subnets from subnet requestor process 103c on router 102c. Subnets for other local networks are provided by subnet manager 110 in response to requests for subnets from subnet requestor process 103a on router 102a. A subnet requestor process on a router is collectively referenced herein as subnet requester 103.

According to an embodiment, a network administrator provides to one or more of the subnet managers a list of one or more subnets for configuring hosts on the network 100. The subnet managers communicate among each other to delegate subnets based on the one or more subnets provided by the network administrator, as described in Johnson et al.

Figure 2:
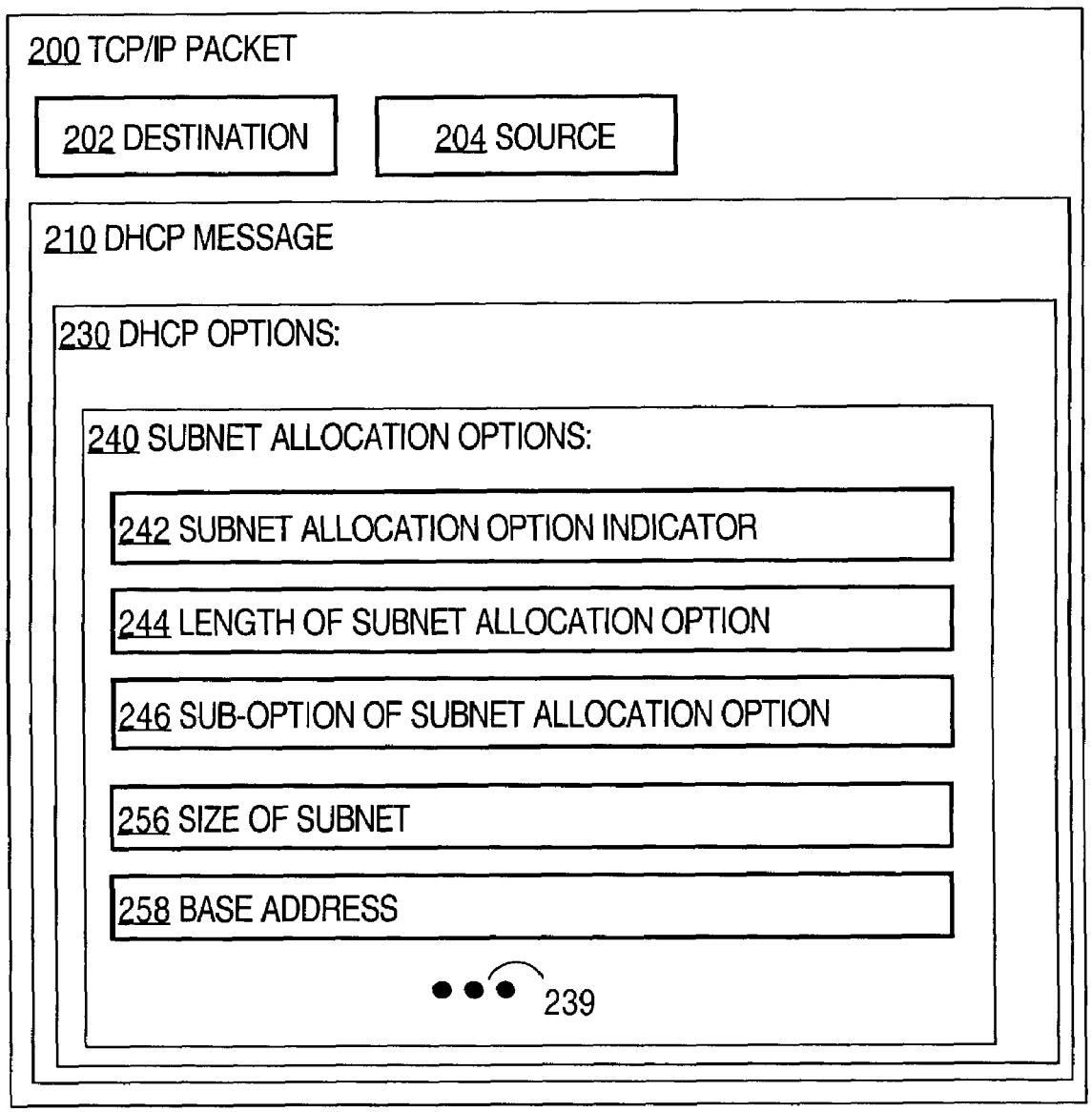
FIG. 2 is a block diagram that illustrates a message for a subnet manager according to an embodiment.

FIG. 2 is a block diagram that illustrates a packet 200 including a DHCP message used to delegate address space between subnet managers, according to an embodiment. DHCP messages are included in transport control protocol IP (TCP/IP) data packets. TCP/IP packets include a destination field 202 and a source field 204, among other fields. The destination field holds data indicating the IP address of the intermediate device or host that is to receive the TCP/IP packet. Routers efficiently transmit TCP/IP packets using hardware configured to interpret the destination address in destination field 202. The source field holds data indicating the IP address of the intermediate device or host that sent the TCP/IP packet.

The TCP/IP packet includes payload data that is not used by TCP/IP to transfer packets. The illustrated embodiment includes a DHCP message 210 in the data payload. A DHCP message 210 includes a set of fields used in an earlier protocol for passing IP addresses, and a set of fields in a DHCP options portion 230 of the DHCP message. According to Johnson et al., the DHCP options portion includes a subnet allocation option portion 240. The subnet allocation portion 240 is specified according to the DHCP for specifying options in a DHCP message. The subnet allocation option includes an indicator field 242 and a length field 244. The indicator field 242 distinguishes the subnet allocation option portion from other options defined for the DHCP message 210. The length field 244 specifies how many bytes comprise the option, so that a process reading the DHCP message can skip past the subnet allocation option if appropriate.

According to Johnson et al., several sub-options are defined for the subnet allocation option, to indicate the information in the message. For example, one sub-option is used in messages to request one or more subnets. Another sub-option is used to specify one or more subnets in offers, acknowledgements and renewals. Another sub-option is used to specify usage of one or more subnets in renewals. The sub-option field 246 holds data indicating the sub-option of the subnet allocation option. Depending on the sub-option, one or more of the following subnet allocation fields are included in the message. The size of subnet field 256 holds data indicating the mask size of a subnet requested, or a subnet provided, depending on the sub-option. The base address field 258 holds data indicating the base address, and comprises 32 bits. The ellipsis 239 indicates other fields in the sub-option.

3. Functional Overview

FIG. 3 is a functional decomposition diagram that illustrates a high level overview of one embodiment 300 of a method for managing subnets. Although steps are illustrated in FIG. 3 and subsequent flowcharts in a particular order, such steps may be reordered or occur at overlapping times in other embodiments.

In step 310, the subnet manager obtains one or more subnets. For example, data is received from a network administrator indicating one or more subnets by their base addresses and sizes. The network administrator could provide a block of address space to distribute, which consists of, for example, a single subnet starting at A.B.0.0 with mask size 16. In another example, a message is sent requesting from another subnet manager an address space made up of one or more subnets of requested sizes. In response, a message is received from the other subnet manager that includes data indicating a particular block of address space made up of one or more subnets of given sizes and given lease times. For example, a message is received including in the address space the subnet with base address A.B.0.0 and mask size 16.

In step 320, acting as a conventional DHCP server, the subnet manager provides leased individual network addresses to one or more hosts on the network. The leased addresses come from a subnet that is selected based on one or more of the policy processes.

In step 330, the subnet manager provides subnets to another subnet manager or device, such as a router, that requests multiple network addresses on the network. The subnet provided is selected based on one or more of the policy processes.

The selection of a subnet according to one or more of the policy processes in steps 320 and 330 is described in more detail below, with reference to FIG. 5A.

In step 340, the subnet manager determines usage of subnets. For example, subnet usage information is reported in a message requesting renewal. In step 350, the subnet manager renews the lease on one or more subnets obtained in step 310 or provided in step 330. In some embodiments, the number of addresses, or the base address, or both, in the renewed subnet depends on the usage statistics determined in step 340.

4. Data Structure Holding Subnets

According to an illustrated embodiment, a block of the address space obtained in step 310 is stored in data structure 140. The use of the data in the data structure 140 depends on the policy process for selecting a particular subnet in response to a request. FIG. 4 is a block diagram that illustrates data structures storing subnets for three policy processes, according to the illustrated embodiment. A record is entered in the data structure for each subnet depicted in FIG. 4.

According to a first policy implemented in a first policy process, a block of contiguous address space 420 obtained in step 310, to be delegated by subnet manager 110, is divided into multiple equally sized subnets, including subnets 421, 422, 423, 424, 425, 426, 427, 428. Additional subnets to fill the block of contiguous address space 420 are represented by ellipsis 439. For example, the block 420, which has base address A.B.0.0 and mask size 16, is split into 512 equal subnets with mask size 25. At a mask size of 25, each subnet includes 128 addresses. The subnets are selected in order, using rules described in more detail below with reference to FIG. 5A. The dashed line 402 indicates a middle of the block of address space to be delegated as subnets.

According to a second policy implemented in a second policy process, a block of address space 440 obtained in step 310, to be delegated by subnet manager 110, is divided into multiple subnets of varying sizes, including subnets 441, 442, 443, 444, 445, 446, 447. Subnets 441 and 442 are the smallest subnets (largest mask size), subnets 443, 444, 445 and 447 are larger (smaller mask size), and subnet 446 is still larger (still smaller mask). Ellipsis 449 indicates other subnets of these or other sizes to fill the block 440. Subnet 463 is unallocated and un-delegated space at the end of the block 440. For example, the block 440, which has base address A.B.0.0 and mask size 16, could be split into eight subnets with mask size 21 (2048 addresses), 30 subnets with mask size 23 (512 addresses), 128 subnets with mask size 25 (128 addresses), 256 subnets with mask size 26 (64 addresses), and 32 subnets with mask size 27 (32 addresses). In the second policy, the subnets are selected by matching a requested size to reduce waste of address space, using rules described in more detail below with reference to FIG. 5B.

According to a third policy implemented in a third policy process, as in the first policy, a block of contiguous address space 470 obtained in step 310, to be delegated by subnet manager 110, is divided into multiple equally sized subnets, including subnets 471, 472, 481, 482, 483, 484, 491, 492. Additional subnets to fill the contiguous address space 470 are represented by ellipses 479, 489. In the third policy, the subnets are selected by reserving adjacent subnets for each device for efficient route summarization, as described in more detail below with reference to FIG. 5C.

5. Method for Selecting Subnets

Figure 5A:
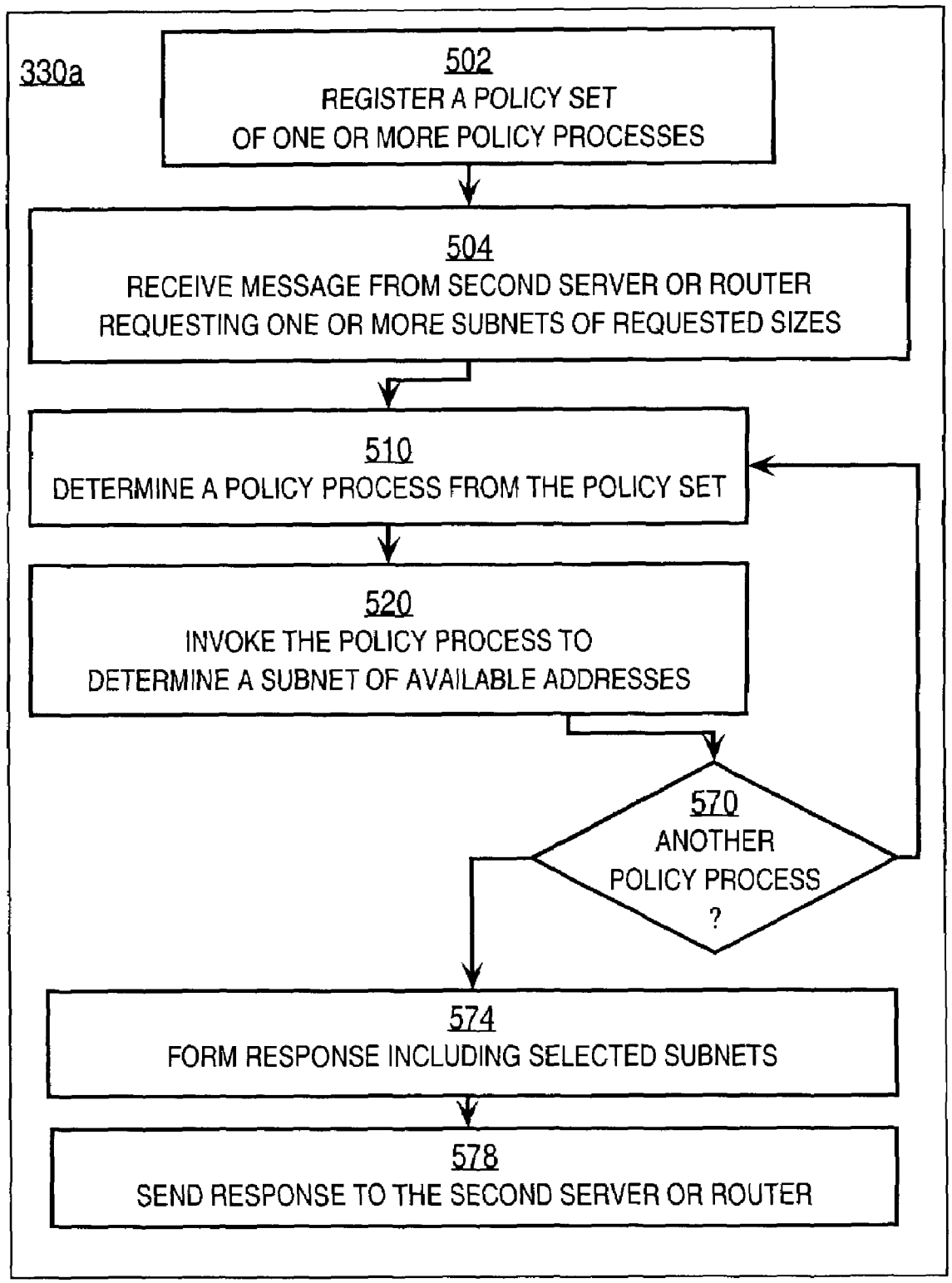
FIG. 5A is a flowchart that illustrates one embodiment of a method for performing the step of providing subnets of FIG. 3.

FIG. 5A is a flowchart that illustrates a method for selecting a subnet according to embodiment 330a of step 330 of FIG. 3.

5.1 Subnet Selection Policy Information

In step 502, subnet selection policy information is generated and stored by registering a set of one or more policy processes to be invoked by the subnet manager. In some embodiments, one or more routines that implement one or more policies are included within the source code for the subnet manager or are linked to the subnet manager. In some embodiments, the source code or compiled code or executable code for one or more such routines is included in the policy information. The network resource address for executable code that implements such a routine may be included in the policy information. The network resource address for a server that executes on a remote device to implement one or more policies may be included in the policy information.

In the illustrated embodiment, the source code instructions to implement the first policy reside within the instruction set for the subnet manager, and the policy information includes the name of a file containing compiled code for a routine that implements the second policy and the third policy, depending on the value of an input parameter. The policy information also includes the network resource address and request format for a policy server process supplied by a user, which operates on a remote machine. The policy information also includes sequence data indicating that the first policy process is executed first, then the user-supplied policy process is executed. Depending on the response from the user-supplied process, the second policy process or the third policy process or neither is executed.

5.2 Executing the First Policy Process

In step 504, a message is received from another subnet manager, or from a router, for a subnet. For example, subnet requestor 103b on router 102b sends a request for a subnet to use on a local network 122 just connected to interface 104a of router 102b. The request indicates the subnet size should include at least 32 addresses, i.e., have a mask size of 27 or less.

In step 510 a policy process to be invoked is determined based on the policy information. For example, based on the sequence data of the policy information, it is determined to invoke the first policy process, which is a built-in policy process.

In step 520 the policy process determined in step 510 is invoked. In the case of a built-in policy process, such as the first policy process, the process is invoked simply by executing the instructions of the subnet manager. In the illustrated embodiment, the first policy process simply selects the next available subnet of the equal sized subnets. It is assumed for purposes of explanation, that no other subnet requesting process has requested a subnet since the subnet manager obtained the block of contiguous address space 420 in step 310. According to the first policy the subnet selected is subnet 421. For example, the subnet with base address A.B.0.0 and mask size 25 is selected.

In step 570, it is determined whether another policy process is to be invoked based on the policy information. If it is determined in step 570 that no other policy process is to be invoked control passes to step 574 to form a response that includes the selected subnets. For example, assuming for the purpose of illustration that the sequence data did not indicate the remote policy process should be invoked next, control would pass to step 574 to include the subnet 421 in the response.

In step 578, the response is sent to the subnet requesting process. For example, the response indicating subnet 421 is sent to router 102b for use on the local network 122 connected to interface 104a.

For purposes of illustration, it is assumed that subsequent requests are received, in order, from subnet requester 103c on router 102c for local network 128 on interface 105a, from subnet manager 132, from subnet requestor 103c on router 102c for local network 126 on interface 105b, and from subnet requester 103b on router 102b for local network 124 on interface 104b, the subnets distributed by the first policy process are listed in Table 1.

TABLE 1

Example Subnets Distributed According to the First Policy Process.

| Requesting Process | For use by | Requested Mask size | Assigned Subnet(s) | Assigned Subnet size |
|---|---|---|---|---|
| process 103b | interface 104a | 27 | 421 | 25 |
| process 103c | interface 105a | 26 | 422 | 25 |
| manager 132 | self | 24 | 423, 424 | 24 |
| process 103c | interface 105b | 27 | 425 | 25 |
| process 103b | interface 104b | 26 | 426 | 25 |

Two disadvantages of the first policy process are exemplified in Table 1. First, subnets are defined that are larger than requested, potentially wasting scarce address space. For example, subnets 421, 425 are four times larger than requested, potentially wasting 75% of the address space allocated; and subnets 422, 426 are twice the size requested, potentially wasting 50% of the address space allocated. Second, subnets assigned to the same device are not contiguous, preventing efficient route summarization and thereby wasting bandwidth and computational resources of routers. For example, non-adjacent subnets 421, 426 are assigned to router 102b, causing router 102b to advertise two subnets that should be directed to it, rather than one larger subnet; and causing several routers in the network vicinity to use two entries instead of one in their routing tables for directing traffic to router 102b.

5.3 Executing a User-Supplied Policy Process

If it is determined in step 570 that another policy process is to be invoked, control passes back to step 510 to determine the next policy process to invoke. For example, it is determined in step 570 to invoke another policy process based on the sequence data in the policy information, and control passes back to step 510 to invoke the next policy process.

Back at step 510, it is determined which policy process to invoke based on the policy information. For example, it is determined to invoke the user-supplied policy process.

In step 520, the user-supplied policy process is invoked. The user-supplied policy process is invoked by sending a message to the remote device and receiving a response that guides the choice of a subnet. For example, a message is sent to the network resource address of the user-supplied policy process. In this example, the message includes the requested size of the subnet, mask size 27 or less, the source address of the request, identifying router 102b, and the selected subnet 421 having base address A.B.0.0 and mask size 25. The response from an example user-supplied process indicates one of five possible next steps; 1) no change is made to the selection resulting from the first policy; 2) a different subnet is provided to use in place of the subnet selected using the first policy process; 3) the second policy process is to be invoked; 4) the third policy process is to be invoked; or 5) the result from the first policy process is rejected and the subnet server should determine what steps to perform next.

In some embodiments, the user-supplied policy process performs other functions as well. For example, the user-supplied policy process reports subnet usage to another application, such as a billing application that computes a bill for a customer to pay based on subnet usage.

It is assumed, for purposes of illustration, that the user-supplied policy process invoked in step 520 sends a response indicating to go forward with the results of the first policy process.

Control then passes to step 570, where it is determined that another policy process is not to be invoked. Control then passes to steps 574 and 578 to prepare and send a response with the subnet 421 selected from the first policy process.

By allowing a network administrator to use the policy information to specify the subnet selection policy tailored to a network's architecture, the techniques of the present invention provide improved subnet management that can overcome one or more disadvantages of more conventional techniques.

5.4 Executing the Second Policy Process

Figure 5B:
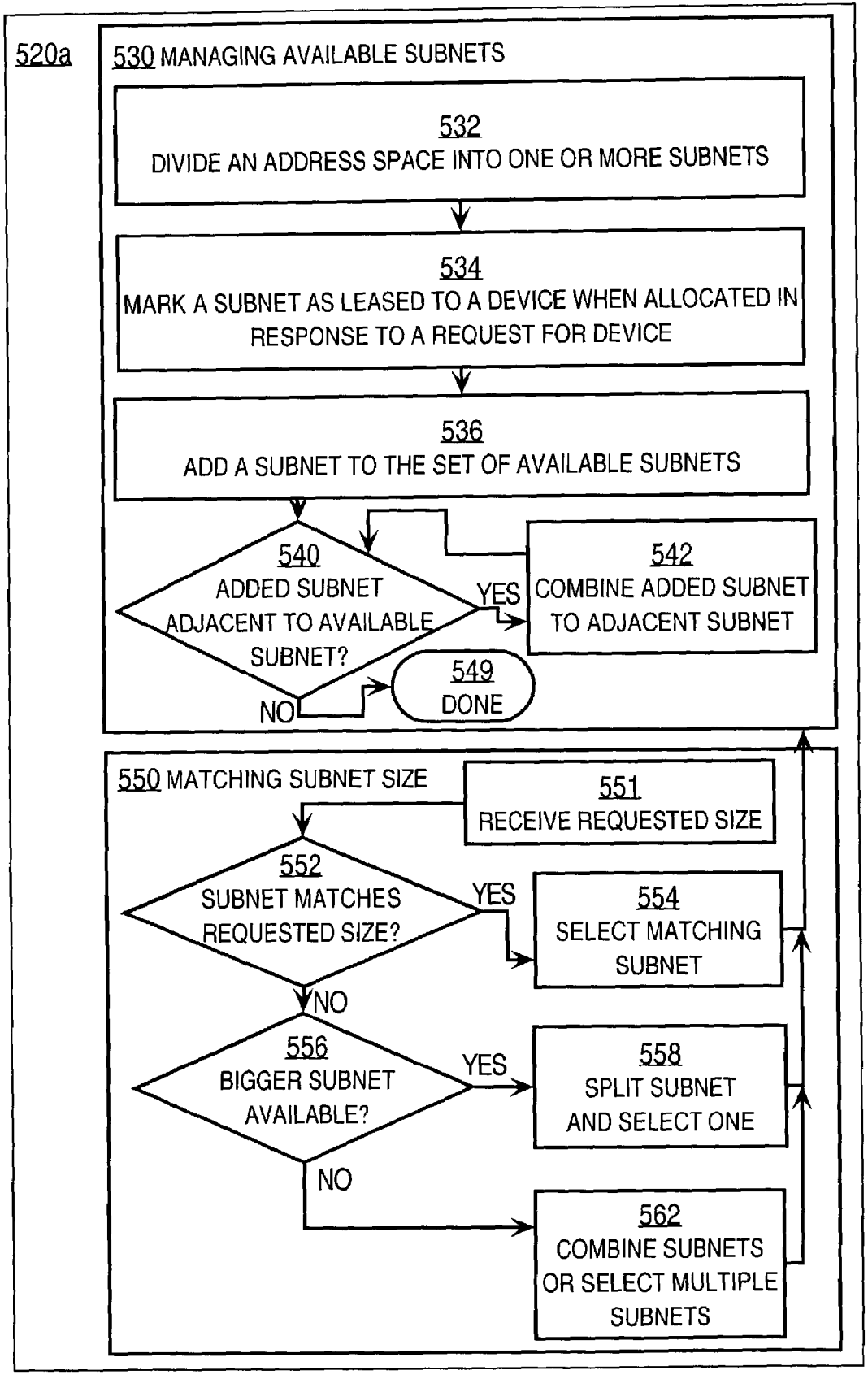
FIG. 5B is a flowchart that illustrates one embodiment of a policy process invoked in a step of the method of FIG. 5A.

FIG. 5B is a flowchart that illustrates a method for implementing a second policy according to embodiment 520a of step 520 of the method of FIG. 5A. The second policy process implements rules that favor reducing waste of address space by providing subnets no bigger than requested. In step 530 available subnets are managed as subnets are formed, delegated or allocated, and released. In step 550, a particular subnet is selected based on matching the size in the request to the available subnets. It is assumed, for purposes of illustration, that the user-supplied policy process invoked in step 520 sends a response indicating that the subnet manager should invoke the second policy process in response to every request.

Step 530 includes steps 532 through 542. In step 532, an address space is divided into subnets of various sizes. For example, the block 440, which has base address A.B.0.0 and mask size 16, is split into 8 subnets with mask size 21, 30 subnets with mask size 23, 128 subnets with mask size 25, 256 subnets with mask size 26, and 32 subnets with mask size 27.

In an illustrated embodiment, the contiguous address space is not divided before a request is received, but rather a subnet is divided from the available address space as needed based on the request. This is described in more detail below.

In the depicted embodiments, the subnets of various sizes are interspersed and not segregated by size. In some embodiments the records are indexed by size, or a list of subnets is sorted by size, in increasing order so that the subnets can be searched efficiently for a subnet of a given size.

In some embodiments, the second policy process maintains the records indicating the subnets. The subnet base addresses and sizes may be returned to the subnet manager and the manager maintains the data structure; the policy process accesses the data structure to determine the current state of the subnets in the data structure as needed. Further, the policy process may maintain only a list of the available subnets by base address and mask size and sorts that list, as needed. The subnet manager maintains other information associated with each subnet, such as the lease time or lessee name and address.

Step 532 includes dividing one subnet into two or more smaller subnets. For example, in step 550 for matching subnet sizes to requests, it may be determined to split a subnet, as described in more detail below. The data structure is updated to reflect that two or more subnets replace the one subnet, for example by deleting a record for the original subnet and adding records for the two or more subnets formed from the split-up.

In step 534 a subnet is marked as leased when allocated to a device, or delegated to another subnet manager. The leased subnet is associated with the device to which the subnet is allocated, such as by storing the network address of the device in the record of the data structure associated with the subnet. In a similar manner, the leased subnet is associated with the subnet manager to which the subnet is delegated, such as by storing the network address of the subnet manager in the record of the data structure associated with the subnet. In some embodiments, the subnet is marked as leased automatically by the subnet manager and step 534 can be omitted in the policy process. Step 534 includes marking as leased one of the subnets split from a larger subnet during step 550.

In step 536, a subnet is added to the set of available subnets. For example, a leased subnet is released in a message sent to the subnet manager. In some embodiments, the subnet manager marks the subnet as available automatically and step 536 can be omitted in the policy process.

In step 540, it is determined whether the added subnet is adjacent to an available subnet. In some embodiments, the policy process sorts the list of available subnets by address; and it is determined whether any neighboring records have addresses that are contiguous. If not, step 540 is complete as indicated by control passing to step 549 in FIG. 5B. If the added subnet is adjacent to an available subnet, control passes to step 542 in which the subnets are combined, if possible. For example, if the subnets are the same size and the lower base address contains all zeros outside the mask, the subnets are combined. The two entries in the data structure are replaced by a single entry of a larger sized subnet. Control then passes back to step 540.

Steps 540 and 542 consolidate address space into larger subnets to balance the splitting of large subnets into smaller subnets to match requested sizes. In some embodiments, subnets are combined as needed while matching subnets to requests in step 550, as described below; and steps 540 and 542 are omitted.

Step 550 includes steps 551 through 562. In step 551, the requested size is received when the second policy process is invoked in response to a request. For example, a request for a subnet of mask size 27 (32 addresses) is received for local network 122 connected to interface 104a of router 102b. In some embodiments, the subnet manager invokes the policy process with a different request size than the size in the request message. For example, as described in Johnson et al., the subnet manager may decrease the requested size from the value in the request message if the subnet usage is below some threshold.

In step 552 it is determined whether an available subnet has a size that equals the requested size. If so, control passes to step 554 to select the available subnet having the same size. If not, control passes to step 556 to find an available subnet bigger than the requested size (with a smaller mask size). Control then passes back to step 530 to manage the available subnets by marking the subnet as leased in step 534.

For example, upon receiving the first request, the block comprises one large available subnet of mask size 16. Therefore, it is determined in step 552 that no subnet of the same size is found and control passes to step 556.

In step 556, it is determined whether a bigger subnet having a smaller mask size is available. If so, control passes to step 558 to split the subnet into two or more subnets, at least one having the requested size, and selecting one subnet with the requested size. Control then passes to step 530 to manage the available subnets by removing the subnet just split from the list of subnets, adding the subnet selected to the records of leased subnets, and adding the remaining subnets generated by the splitting to the records of available subnets.

For example, to obtain a subnet of requested mask size 27, the subnet of mask size 16 is split into two subnets of mask size 17, one of those is split into two subnets of mask size 18, etc., until two subnets 441, 442 of mask size 27 are generated. The splitting by two guarantees that each subnet of a given mask size contains only zeros in the base address in the bits outside the mask, as is conventional for subnets. Subnet 441 is selected to satisfy the request for a subnet of mask size 27. For purposes of illustration, assume that, adjacent to the two subnets of mask size 27 is a subnet 443 of mask size 26. Assume further that, adjacent to subnet 443 is a subnet (not shown) of mask size 25 where subnets 444, 445 appear in FIG. 4 for reasons that are explained below. Assume further that, adjacent to subnets 444, 445, is a subnet 446 of mask size 24, and adjacent to subnet 446 is a subnet (not shown) of mask size 23. All such subnets are the result of performing step 558. Control then passes to step 530 to remove the subnet of mask size 16 from the records of subnets, to add the new subnets except subnet 441 to the records of available subnets, and to add subnet 441 to the records of leased subnets.

If it is determined in step 556 that a subnet bigger than requested is not available, then control passes to step 562 to select several subnets to satisfy the request. In embodiments that do not consolidate adjacent available subnets in steps 540, 542, described above, such consolidation is performed in step 562, before selecting subnets to satisfy the request. If not enough subnets remain to satisfy the request, then the policy process returns an error to the calling subnet manager indicating the request can not be satisfied. Control then passes to step 530 to manage the change of available subnets.

For the purposes of illustration, requests are assumed to be received as in the example for the first policy. That is, requests are received, in order: 1) for mask size 27 from subnet requestor 103b on router 102b for local network 122 on interface 104a; 2) for mask size 26 from subnet requestor 103c on router 102c for local network 128 on interface 105a; 3) for mask size 24 from subnet manager 132; 4) for mask size 27 from subnet requestor 103c on router 102c for local network 126 on interface 105b; and 5) for mask size 26 from subnet requestor 103b on router 102b for local network 124 on interface 104b.

The subnets distributed by the second policy process are listed in Table 2 and depicted by subnets 441 through 444 and 446 in FIG. 4. The selection of subnet 441 for the first request, as shown in the first line of Table 2, has already been described above. In the following, it is described in detail how the other subnets are selected according to the second policy.

TABLE 2

Example Subnets Distributed According to the Second Policy Process.

| Requesting Process | For use by | Requested Mask size | Assigned Subnet(s) | Assigned Subnet size |
|---|---|---|---|---|
| process 103b | interface 104a | 27 | 441 | 27 |
| process 103c | interface 105a | 26 | 443 | 26 |
| manager 132 | self | 24 | 446 | 24 |
| process 103c | interface 105b | 27 | 442 | 27 |
| process 103b | interface 104b | 26 | 444 | 26 |

When the second request is received from process 103c for the local network 128 on interface 105a for a subnet of size 26, the second policy is invoked and control passes to step 552 to find an available subnet that has the requested mask size 26. As described above, subnet 443 of mask size 26 was generated during step 558 while satisfying the first request, and is now available. Thus a match is found in step 552 with subnet 443 and control passes to step 554 to select subnet 443 to satisfy the request, as shown in the second line of Table 2. Control passes to step 530 in which subnet 443 is marked as leased, rendering subnet 443 no longer available.

When the third request is received from the subnet manager 132 for a subnet of size 24, the second policy is invoked and control passes to step 552 to find an available subnet that has the requested mask size 24. As described above, subnet 446 of mask size 24 was generated during step 558 while satisfying the first request, and is now available. Thus a match is found in step 552 with subnet 446 and control passes to step 554 to select subnet 446 to satisfy the third request, as shown in the third line of Table 2. Control passes to step 530 in which subnet 446 is marked as leased; rendering subnet 446 no longer available.

When the fourth request is received from process 103c for the local network 126 on interface 105b for a subnet of mask size 27, the second policy is invoked and control passes to step 552 to find an available subnet that has the requested mask size 27. As described above, subnet 442 of mask size 27 was generated during step 558 while satisfying the first request and is now available. Thus a match is found in step 552 with subnet 442 and control passes to step 554 to select subnet 442 to satisfy the request, as shown in the fourth line of Table 2. Control passes to step 530 in which subnet 442 is marked as leased, rendering subnet 442 no longer available When the fifth request is received from process 103b for the local network 124 on interface 104b for a subnet of size 26, the second policy is invoked and control passes to step 552 to find an available subnet that has the requested mask size 26. As described above, a subnet (not shown) of mask size 25 and a subnet (not shown) of mask size 23 were generated during step 558 while satisfying the first request, and are now available. However, no match is found in step 552 for an available subnet of mask size 26. Subnet 443 has mask size 26, but subnet 443 is not available. Control passes to step 556 to find a bigger available subnet (with a mask size less than 26).

In one embodiment, the subnet of mask size 25 is found and control passes to step 558 to split the subnet to produce a subnet of the requested size. In step 558, the subnet of mask size 25 is split into two subnets 444, 445 of mask size 26. Subnet 444 is selected to satisfy the request, as shown in the fifth line of Table 2. Control passes to step 530 in which the subnet of mask size 25 is removed from the records of subnets, subnet 444 is added to the records of leased subnets, rendering subnet 443 no longer available, and subnet 445 is added to the records of available subnets.

In another embodiment, the subnet of mask size 23 is found and control passes to step 558 to split the subnet to produce a subnet of the requested size. In step 558, the subnet of mask size 23 is split multiple times to produce subnet 447 of mask size 26 among other larger subnets (of mask sizes less than 26). Subnet 447 is selected to satisfy the request, not shown in Table 2. Control passes to step 530 in which the subnet of mask size 23 is removed from the records of subnets, subnet 447 is added to the records of leased subnets, rendering subnet 447 no longer available, and the other larger subnets generated are added to the records of available subnets. This embodiment is not described further.

Comparing Table 2 with Table 1, and subnets 441-444 and 446 with subnets 421-426 in FIG. 4, it can be seen that dividing the block according to the second policy consumes less address space to satisfy the same requests than is consumed according to the first policy. In addition, according to the second policy, subnet 445 is still available for satisfying the next request for a subnet of mask size 27 or greater mask size. Thus the second policy offers advantages over the first policy for some networks, such as networks with scarce address space.

One disadvantage of the second policy process is exemplified in Table 2. Subnets assigned to the same device are not contiguous, preventing efficient route summarization and thereby wasting bandwidth and computational resources of routers. For example, non-adjacent subnets 441 and 444 are assigned to router 102b, causing router 102b to advertise two subnets that should be directed to it, rather than one larger subnet; and causing several routers in the network vicinity to use two entries instead of one in their routing tables for traffic to direct to router 102b.

As described above with reference to steps 536, 540, 542, when a leased subnet is released, the second policy process determines whether the released subnet can be consolidated with an adjacent subnet to form a larger subnet. An example can now be provided using the leased subnets in Table 2. If subnet 444 of base address A.B.0.128 and mask size 26 is released by the requesting process 103b on router 102b, then subnet 444 is added to the records of available subnets in step 536. In step 540, it is determined that newly added subnet 444 is adjacent to available subnet 445 of base address A.B.0.192 of mask size 26, so control passes to step 542 to combine the two subnets. In step 542 it is determined that the combined subnet of mask size 25 would begin at a base address, A.B.0.128, that is all zeroes in bits 26 through 32 and is thus a valid subnet of size 25. The two subnets 444, 445 of mask size 26 are combined into a subnet, not shown, of base address A.B.0.128 and mask size 25. The subnets 444 and 445 are removed from the records of available subnets and replaced with a single subnet of base address A.B.0.128 and mask size 25 in the records of available subnets.

5.5 Executing the Third Policy Process

Figure 5C:
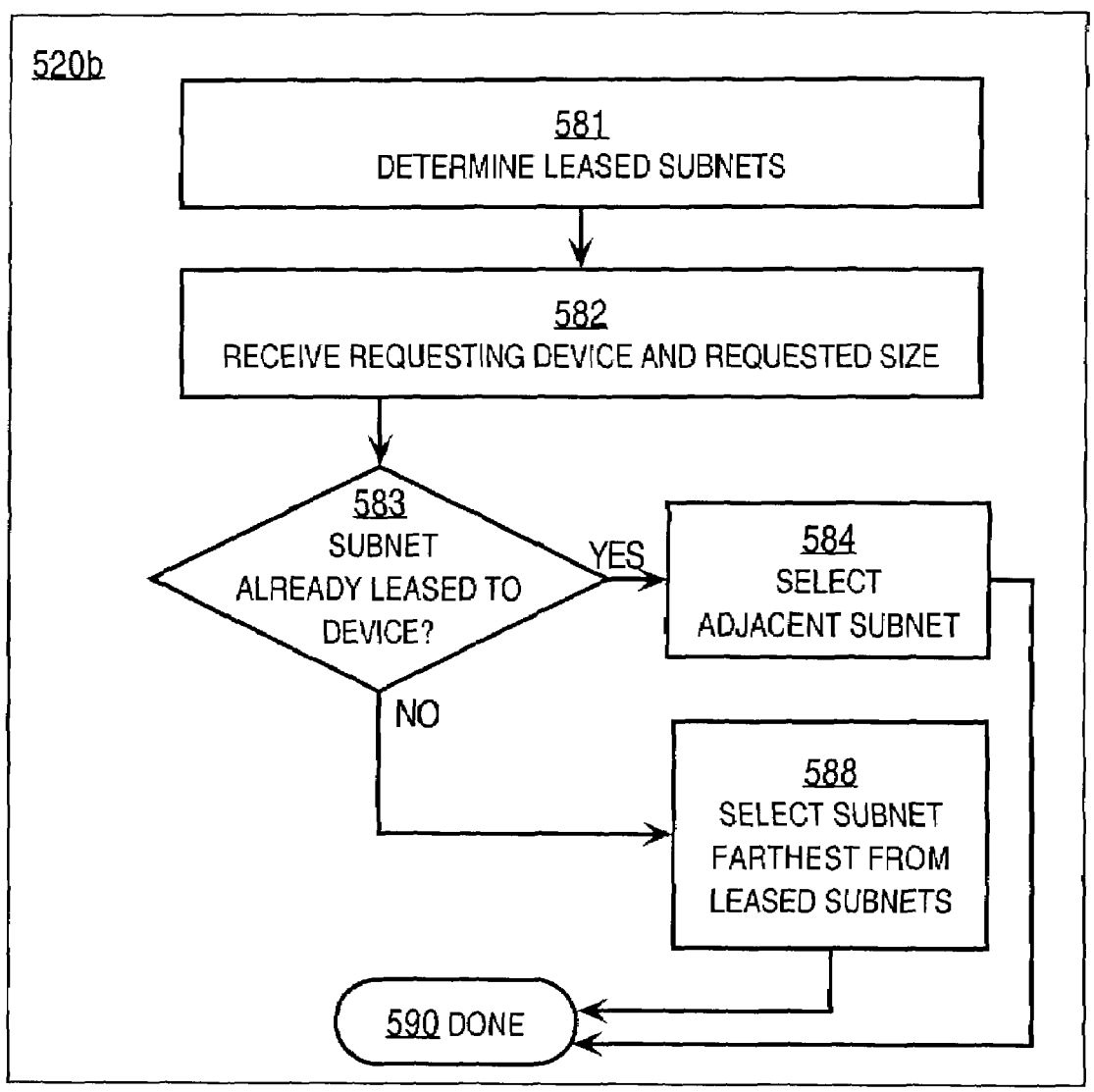
FIG. 5C is a flowchart that illustrates another embodiment of a policy process invoked in a step of the method of FIG. 5A.

FIG. 5C is a flowchart that illustrates a method for implementing a third policy according to embodiment 520b of step 520 of the method of FIG. 5A. The third policy process implements rules that favor more efficient routing by assigning contiguous subnets to each device when possible. It is assumed, for purposes of illustration, that the user-supplied policy process invoked in step 520 sends a response indicating that the subnet manager should invoke the third policy process in response to every request.

In step 581, leased subnets are determined. In some embodiments, the third policy process maintains the records indicating the subnets. In some embodiments, as described above, the subnet base addresses and mask sizes are returned to the subnet manager and the manager maintains the data structure; the policy process accesses the data structure to determine the current state of the subnets in the data structure, as needed. In the illustrated embodiment, the block of address space 470 is initially divided among equal sized subnets, as in the first policy, and all the subnets are available. Thus, initially in the illustrated embodiment, step 581 determines that no subnets are leased.

In step 582, data is received indicating the requested size and the requesting device when the third policy process is invoked in response to a request. For example, a request for a subnet of mask size 27 (32 addresses) is received for local network 122 connected to interface 104a of router 102b. As described above for the second policy, the subnet manager may determine to invoke the third policy process with a request size different than the subnet size in the request message. In the illustrated embodiment, the device is identified by the source address of the message from the requesting process. For example, the network address of router 102b identifies the device 102b.

In step 583 it is determined whether a subnet has already been leased to the requesting device. If so, control passes to step 584 to select an available subnet adjacent to the subnet already leased for the requesting device. If not, control passes to step 588 to select an available subnet as far as possible from all the subnets already leased to any device. Control then passes back to step 590, completing processing by the third policy process.

For example, upon receiving the first request, the block comprises 128 available subnets of mask size 25, including subnets 471, 472, 481, 482, 483, 484, 491, 492, and no leased subnets. Therefore, it is determined in step 583 that no subnet has already been leased to the device 102b, and control passes to step 588.

In step 588, the first subnet 471 of base address A.B.0.0 and mask size 25 is selected since no subnet is yet leased to any device. Since subnet 471 of mask size 25 is bigger than the requested subnet of mask size 27, no additional subnets are selected. Control passes to step 590, completing the processing. The subnet manager leases the selected subnet by sending a response to the requesting process that includes the selected subnet 471. The subnet manager also inserts data indicating the network address of the requesting process in the records of the leased subnets.

For the purposes of illustration, it is further assumed that requests are received as in the example for the first policy and the second policy. That is, requests are received, in order: 1) for mask size 27 from subnet requestor 103b on router 102b for local network 122 on interface 104a; 2) for mask size 26 from subnet requestor 103c on router 102c for local network 128 on interface 105a; 3) for mask size 24 from subnet manager 132; 4) for mask size 27 from subnet requester 103c on router 102c for local network 126 on interface 105b; and 5) for mask size 26 from subnet requestor 103b on router 102b for local network 124 on interface 104b.

The subnets distributed by the second policy process are listed in Table 3 and depicted by subnets 471, 472, 481, 482, 491, 492. The selection of subnet 471 for the first request, as shown in the first line of Table 3, has already been described above. In the following, it is described in detail how the other subnets are selected according to the third policy.

TABLE 3

Example Subnets Distributed According to the Third Policy Process.

| Requesting Process | For use by | Requested Mask size | Assigned Subnet(s) | Assigned Subnet size |
|---|---|---|---|---|
| process 103b | interface 104a | 27 | 471 | 25 |
| process 103c | interface 105a | 26 | 492 | 25 |
| manager 132 | self | 24 | 481, 482 | 24 |
| process 103c | interface 105b | 27 | 491 | 25 |
| process 103b | interface 104b | 26 | 472 | 25 |

When the second request is received from process 103c for the local network 128 on interface 105a for a subnet of size 26, the third policy is invoked and control passes to step 583 to find a subnet leased for device 102c. No such leased subnet is found, and control passes to step 588. In step 588, an available subnet farthest from the subnets already leased is selected. The only subnet leased is subnet 471. The farthest subnet from subnet 471 is subnet 492. Therefore subnet 492 is leased to device 102c in response to the second request, as indicated by the second line in Table 3. The subnet manager sends the subnet 492 to the requesting process 103c on device 102c. The subnet manager includes data indicating the network address of device 102c of the requesting process 103c in the record for leased subnet 492.

When the third request is received from the subnet manager 132 for a subnet of size 24, the third policy is invoked and control passes to step 583 to find a subnet leased for device 133. No such leased subnet is found, and control passes to step 588. In step 588, an available subnet farthest from the subnets already leased is selected. The subnets leased are subnets 471, 492. To obtain the farthest subnet, the block of address space is split in half at the middle 402, and the last subnet in the first half, subnet 482, is selected as the farthest subnet from subnet 471 and subnet 492. The subnet 482 is of mask size 25, which is a smaller subnet than the subnet requested of mask size 24. Another subnet of mask size 25 adjacent to the subnet just selected is also selected. Therefore subnet 481 is also selected. In some embodiments, subnets 481 and 482 are combined into a subnet of mask size 24 before passing the selected subnets back to the subnet manager. In the illustrated embodiment, the two selected subnets are returned to the subnet manager. Therefore subnets 481, 482 are leased to device 133 in response to the third request, as indicated by the third line in Table 3. The subnet manager sends the subnets 481, 482 to the requesting process 132 on device 133. The subnet manager includes data indicating the network address of device 133 of the requesting process 132 in the records for leased subnets 481, 482.

When the fourth request is received from process 103*c* for the local network 126 on interface 105*b* for a subnet of mask size 27, the third policy is invoked and control passes to step 583 to find a subnet leased for device 102*c*. The leased subnet 492 is found. Control passes to step 584 to select a subnet adjacent to the found subnet 492. In step 584, an available subnet 491, adjacent to leased subnet 492, is selected. Therefore subnet 491 is leased to device 102*c* in response to the fourth request, as indicated by the fourth line in Table 3. The subnet manager sends the subnet 491 to the requesting process 103*c* on device 102*c*. The subnet manager includes data indicating the network address of device 102*c* of the requesting process 103*c* in the record for leased subnet 491.

When the fifth request is received from process 103*b* for the local network 124 on interface 104*b* for a subnet of size 26, the third policy is invoked and control passes to step 583 to find a subnet leased for device 102*b*. The leased subnet 471 is found. Control passes to step 584 to select a subnet adjacent to the found subnet 471. In step 584, an available subnet 472, adjacent to leased subnet 471, is selected. Therefore subnet 472 is leased to device 102*b* in response to the fifth request, as indicated by the fifth line in Table 3. The subnet manager sends the subnet 472 to the requesting process 103*b* on device 102*b*. The subnet manager includes data indicating the network address of device 102*b* of the requesting process 103*b* in the record for leased subnet 472.

A comparison of Table 3 with Table 1, and a comparison of subnets 471, 472, 481, 482, 491, 492 with subnets 421-426 in FIG. 4, shows that dividing the block according to the third policy consumes the same amount of address space to satisfy the same requests as is consumed according to the first policy. However, according to the third policy, adjacent subnets are allocated to the same device so that subnet summarization can be achieved at each device and routing can be performed more efficiently. For example, device 102*b* receives adjacent subnets 471, 472 which can be summarized as a larger subnet of base address A.B.0.0 and mask size 24. Similarly, device 102*c* receives adjacent subnets 491, 492 which can be summarized as a larger subnet of base address A.B.255.0 and mask size 24. Thus, the third policy offers advantages over the first policy for some networks, such as networks with extensive routing requirements.

One disadvantage of the third policy process is exemplified in Table 3, like Table 1. Subnets are defined that are larger than requested, potentially wasting scare address space. For example, subnets 471 and 491 are four times larger than requested, potentially wasting 75% of the address space allocated; and subnets 472 and 492 are twice the size requested, potentially wasting 50% of the address space allocated.

By allowing a system administrator to invoke the subnet selection policy tailored to a network's architecture, the techniques of the present invention provide improved subnet management that can overcome one or more disadvantages of more conventional techniques.

6. Hardware Overview

Figure 6:
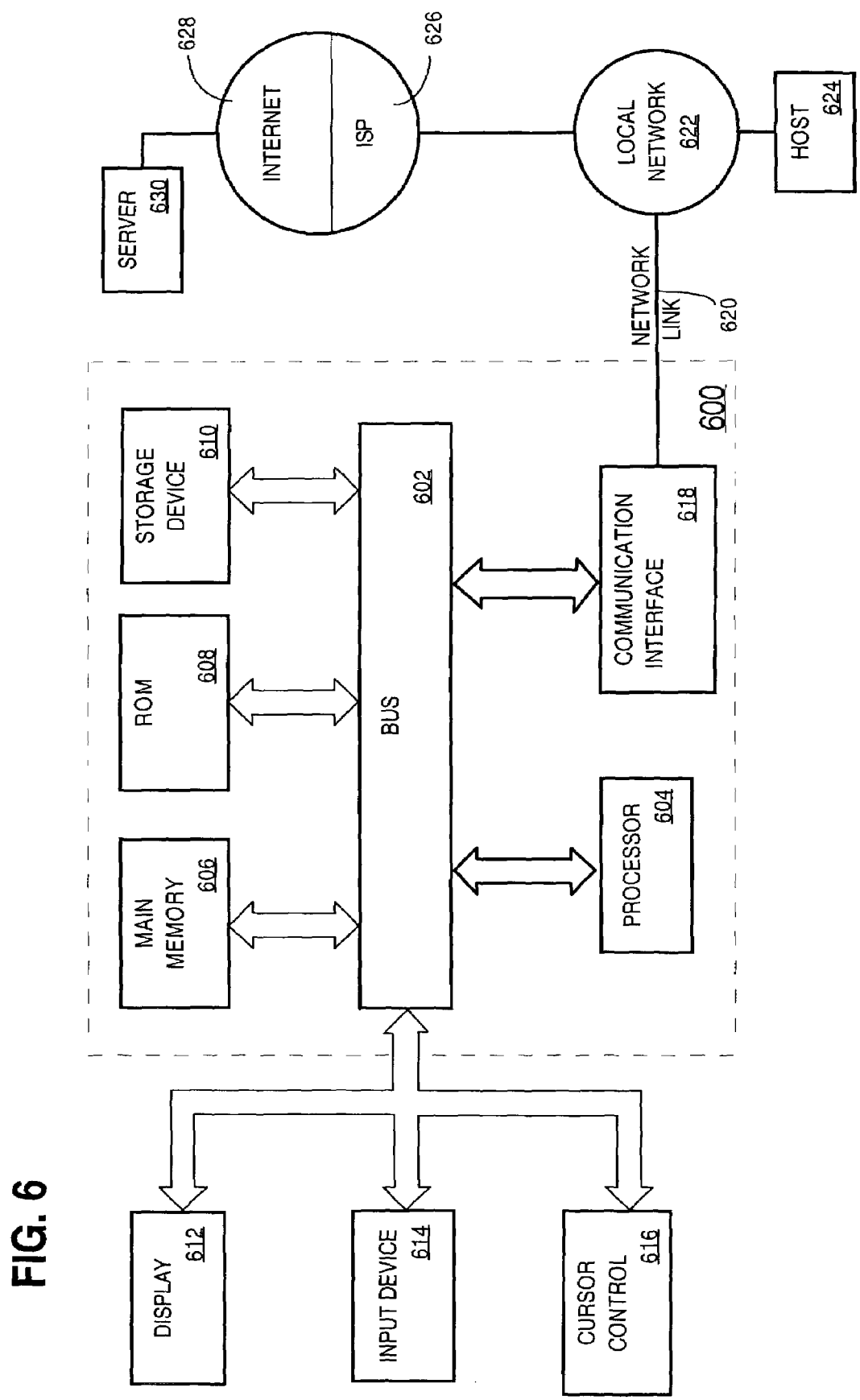
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, transmission media or storage media, e.g. non-volatile or volatile media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

Processor 604 may execute the received code as it is received, and/or stored in storage device 610, or other non-volatile storage for later execution. In this manner, computer system 600 may obtain application code in the form of a carrier wave.

7. Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of providing network addresses for hosts on a network, the method comprising the computer-implemented steps of:
    generating and storing, as part of a subnet management process, network configuration information indicating a plurality of network addresses to be distributed among a plurality of network devices, wherein a subnet is a set of contiguous network addresses;
    generating and storing policy information indicating a policy set of one or more policy processes, each policy process for selecting an available subnet from a plurality of available network addresses of the plurality of network addresses;
    wherein each policy process manages a plurality of available network addresses of the plurality of network addresses;
    receiving, from a subnet requesting process, a request for a subnet to be used by a particular network device;
    invoking a particular policy process to determine a particular subnet based on the network configuration information, the request, and the policy set, wherein the particular policy process manages a particular plurality of available network addresses of the plurality of network addresses and determines the particular subnet by performing:
        determining, based on the request, the particular network device to use the particular subnet;
        determining whether a leased subnet of the plurality of network addresses has already been allocated to the particular network device; and
        selecting from the particular plurality of available network addresses a candidate subnet as the particular subnet, wherein selection of the candidate subnet depends on whether a leased subnet of the plurality of network addresses has already been allocated to the particular network device; and
    sending a response indicating the particular subnet to the subnet requesting process.

2. A method as recited in claim 1, wherein the subnet requesting process is another subnet management process.

3. A method as recited in claim 1, wherein the subnet requesting process is a routing process on a router connected to a local network.

4. A method as recited in claim 1, wherein:
    said step of determining a particular subnet includes the step of determining a particular size for the particular subnet based on the request; and
    the particular policy process of the policy set includes the steps of:
        managing a set of available subnets of the particular plurality of available network addresses of the plurality of network addresses; and
        matching the particular size to a size of a candidate subnet of the set of available subnets; and
        selecting the candidate subnet as the particular subnet.

5. A method as recited in claim 4, said step of managing the set of available subnets further comprising the steps of:
    adding a released subnet to the set of available subnets when the released subnet is made available in the particular policy process;
    determining whether the released subnet is adjacent to a second subnet of the set of available subnets; and
    if it is determined that the released subnet is adjacent, then replacing the released subnet and the second subnet in the set of available subnets with a combined subnet spanning the released subnet and the second subnet.

6. A method as recited in claim 4, said step of matching the particular size to the size of the candidate subnet further comprising the steps of:
 determining whether no subnet of the available subnets has the particular size; and
 if it is determined that no subnet of the available subnets has the particular size, then
  determining a second subnet of the available subnets, which second subnet is bigger than the particular size; and
  splitting the second subnet into the candidate subnet having the particular size and a third subnet.

7. A method as recited in claim 6, wherein the second subnet is a smallest subnet of the available subnets bigger than the particular size.

8. A method as recited in claim 6, wherein the second subnet is a first sequentially encountered subnet of the available subnets bigger than the particular size.

9. A method as recited in claim 1, wherein
 the particular policy process of the policy set includes the step of, if it is determined that the particular leased subnet is allocated to the particular device, then selecting from the available network addresses a candidate subnet adjacent to the particular leased subnet.

10. A method as recited in claim 9, wherein the particular policy process includes the step of, if it is determined that no leased subnet of the set of leased subnets is allocated to the particular device, then selecting from the available network addresses a candidate subnet not adjacent to any leased subnet of the set of leased subnets.

11. A method as recited in claim 1, wherein said step of generating and storing policy information further comprises storing instructions to implement a particular policy process.

12. A method as recited in claim 1, wherein:
 said step of generating and storing policy information further comprises registering a separate policy process into the policy set; and
 said step of determining the particular subnet comprises:
  sending a message to the separate policy process; and
  receiving guidance information affecting a choice of the particular subnet.

13. A method as recited in claim 12, wherein the separate policy process reports subnet usage information to an outside application.

14. A method as recited in claim 12, wherein:
 the message includes the particular subnet selected by a second policy process of the policy set; and
 the guidance information includes data indicating acceptance of the particular subnet by the separate policy process.

15. A method as recited in claim 12, wherein:
 the message includes a second subnet selected by a second policy process of the policy set; and
 the guidance information includes data indicating rejection of the second subnet by the separate policy process.

16. A method as recited in claim 12, wherein:
 the guidance information includes data indicating a particular policy process of the policy set; and
 the method further comprises determining the subnet based on the particular policy process in response to the guidance information.

17. A method as recited in claim 12, wherein the guidance information includes data indicating the particular subnet.

18. A method as recited in claim 1, wherein the policy set includes two or more policy processes.

19. A method as recited in claim 18, wherein the policy information indicates a particular policy process of the policy set to invoke first.

20. A computer-readable storage medium carrying one or more sequences of instructions for providing network addresses for hosts on a network, which instructions, when executed by one or more processors, cause the one or more processors to carry out the steps of:
 generating and storing, as part of a subnet management process, network configuration information indicating a plurality of network addresses to be distributed among a plurality of network devices, wherein a subnet is a set of contiguous network addresses;
 generating and storing policy information indicating a policy set of one or more policy processes, each policy process for selecting an available subnet from a plurality of available network addresses of the plurality of network addresses;
 wherein each policy process manages a plurality of available network addresses of the plurality of network addresses;
 receiving, from a subnet requesting process, a request for a subnet to be used by a particular network device;
 invoking a particular policy process to determine a particular subnet based on the network configuration information, the request, and the policy set, wherein the particular policy process manages a particular plurality of available network addresses of the plurality of network addresses and determines the particular subnet by performing:
  determining, based on the request, the particular network device to use the particular subnet;
  determining whether a leased subnet of the plurality of network addresses has already been allocated to the particular network device; and
  selecting from the particular plurality of available network addresses a candidate subnet as the particular subnet wherein selection of the candidate subnet depends on whether a leased subnet of the plurality of network addresses has already been allocated to the particular network device; and
 sending a response indicating the particular subnet to the subnet requesting process.

21. An apparatus for providing network addresses for hosts on a network, comprising:
 means for generating and storing, as part of a subnet management process, network configuration information indicating a plurality of network addresses to be distributed among a plurality of network devices, wherein a subnet is a set of contiguous network addresses;
 means for generating and storing policy information indicating a policy set of one or more policy processes, each policy process for selecting an available subnet from a plurality of available network addresses of the plurality of network addresses;
 wherein each policy process manages a plurality of available network addresses of the plurality of network addresses;
 means for receiving, from a subnet requesting process, a request for a subnet to be used by a particular network device;
 means for invoking a particular policy process to determine a particular subnet based on the network configuration information, the request, and the policy set, wherein the particular policy process manages a particular plurality of available network addresses of the plurality of network addresses and determines the particular subnet by performing:
  determining, based on the request, the particular network device to use the particular subnet;
  determining whether a leased subnet of the plurality of network addresses has already been allocated to the particular network device; and
  selecting from the particular plurality of available network addresses a candidate subnet as the particular subnet, wherein selection of the candidate subnet depends on whether a leased subnet of the plurality of network addresses has already been allocated to the particular network device; and
means for sending a response indicating the particular subnet to the subnet requesting process.

22. An apparatus for providing network addresses for hosts on a network, comprising:
  a network interface that is coupled to the network for receiving one or more packet flows therefrom;
  a processor;
  one or more stored sequences of instructions which, when executed by the processor, cause the processor to carry out the steps of:
    generating and storing, as part of a subnet management process, network configuration information indicating a plurality of network addresses to be distributed among a plurality of network devices, wherein a subnet is a set of contiguous network addresses;
    generating and storing policy information indicating a policy set of one or more policy processes, each policy process for selecting an available subnet from a plurality of available network addresses of the plurality of network addresses;
    wherein each policy process manages a plurality of available network addresses of the plurality of network addresses;
    receiving, from a subnet requesting process, a request for a subnet to be used by a particular network device;
    invoking a particular policy process to determine a particular subnet based on the network configuration information, the request, and the policy set, wherein the particular policy process manages a particular plurality of available network addresses of the plurality of network addresses and determines the particular subnet by performing:
      determining, based on the request, the particular network device to use the particular subnet;
      determining whether a leased subnet of the plurality of network addresses has already been allocated to the particular network device; and
      selecting from the particular plurality of available network addresses a candidate subnet as the particular subnet, wherein selection of the candidate subnet depends on whether a leased subnet of the plurality of network addresses has already been allocated to the particular network device; and
    sending a response indicating the particular subnet to the subnet requesting process.

23. An apparatus as recited in claim 21, wherein:
said means for determining a particular subnet includes means for determining a particular size for the particular subnet based on the request; and
the particular policy process of the policy set includes means for:
  managing a set of available subnets of the particular plurality of available network addresses of the plurality of network addresses; and
  matching the particular size to a size of a candidate subnet of the set of available subnets; and
  selecting the candidate subnet as the particular subnet.

24. An apparatus as recited in claim 23, said means for managing the set of available subnets further comprising:
  means for adding a released subnet to the set of available subnets when the released subnet is made available in the particular policy process;
  means for determining whether the released subnet is adjacent to a second subnet of the set of available subnets; and
  if it is determined that the released subnet is adjacent, then replacing the released subnet and the second subnet in the set of available subnets with a combined subnet spanning the released subnet and the second subnet.

25. An apparatus as recited in claim 23, said means for matching the particular size to the size of the candidate subnet further comprising:
  means for determining whether no subnet of the available subnets has the particular size; and
  if it is determined that no subnet of the available subnets has the particular size, then
    determining a second subnet of the available subnets, which second subnet is bigger than the particular size; and
    means for splitting the second subnet into the candidate subnet having the particular size and a third subnet.

26. An apparatus as recited in claim 25, wherein the second subnet is a smallest subnet of the available subnets bigger than the particular size.

27. An apparatus as recited in claim 25, wherein the second subnet is a first sequentially encountered subnet of the available subnets bigger than the particular size.

28. An apparatus as recited in claim 21, wherein:
the particular policy process of the policy set includes means for, if it is determined that the particular leased subnet is allocated to the particular device, then selecting from the available network addresses a candidate subnet adjacent to the particular leased subnet.

29. An apparatus as recited in claim 28, wherein the particular policy process includes means for selecting from the available network addresses a candidate subnet not adjacent to any leased subnet of the set of leased subnets, if it is determined that no leased subnet of the set of leased subnets is allocated to the particular device.

30. An apparatus as recited in claim 21, wherein:
said means for generating and storing policy information further comprises registering a separate policy process into the policy set; and
said means for determining the particular subnet comprises:
  means for sending a message to the separate policy process; and
  means for receiving guidance information affecting a choice of the particular subnet.

31. An apparatus as recited in claim 30, wherein:
the guidance information includes data indicating a particular policy process of the policy set; and
the apparatus further comprises means for determining the subnet based on the particular policy process in response to the guidance information.

32. An apparatus as recited in claim 22, wherein:
said step of determining a particular subnet includes the step of determining a particular size for the particular subnet based on the request; and
the particular policy process of the policy set includes the steps of:
  managing a set of available subnets of the particular plurality of available network addresses of the plurality of network addresses; and
  matching the particular size to a size of a candidate subnet of the set of available subnets; and
  selecting the candidate subnet as the particular subnet.

33. An apparatus as recited in claim 32, said step of managing the set of available subnets further comprising the steps of:
  adding a released subnet to the set of available subnets when the released subnet is made available in the particular policy process;
  determining whether the released subnet is adjacent to a second subnet of the set of available subnets; and
  if it is determined that the released subnet is adjacent, then replacing the released subnet and the second subnet in the set of available subnets with a combined subnet spanning the released subnet and the second subnet.

34. An apparatus as recited in claim 32, said step of matching the particular size to the size of the candidate subnet further comprising the steps of:
  determining whether no subnet of the available subnets has the particular size; and
  if it is determined that no subnet of the available subnets has the particular size, then
    determining a second subnet of the available subnets, which second subnet is bigger than the particular size; and
    splitting the second subnet into the candidate subnet having the particular size and a third subnet.

35. An apparatus as recited in claim 34, wherein the second subnet is a smallest subnet of the available subnets bigger than the particular size.

36. An apparatus as recited in claim 34, wherein the second subnet is a first sequentially encountered subnet of the available subnets bigger than the particular size.

37. An apparatus as recited in claim 22, wherein
the particular policy process of the policy set includes the steps of, if it is determined that the particular leased subnet is allocated to the particular device, then selecting from the available network addresses a candidate subnet adjacent to the particular leased subnet.

38. An apparatus as recited in claim 37, wherein the particular policy process includes the steps of, if it is determined that no leased subnet of the set of leased subnets is allocated to the particular device, then selecting from the available network addresses a candidate subnet not adjacent to any leased subnet of the set of leased subnets.

39. An apparatus as recited in claim 22, wherein:
said step of generating and storing policy information further comprises registering a separate policy process into the policy set; and
said step of determining the particular subnet comprises:
  sending a message to the separate policy process; and
  receiving guidance information affecting a choice of the particular subnet.

40. An apparatus as recited in claim 39, wherein:
the guidance information includes data indicating a particular policy process of the policy set; and
further comprising the step of determining the subnet based on the particular policy process in response to the guidance information.

* * * * *